(12) United States Patent
Lee

(10) Patent No.: US 7,629,786 B2  
(45) Date of Patent: Dec. 8, 2009

(54) DEVICE FOR REDUCING HARMONICS IN THREE-PHASE POLY-WIRE POWER LINES

(76) Inventor: Sung Ho Lee, Kyeongsin Apt. 1-202, 386-3 Jacjeon-1dong, Geyang-gu, Incheon (KR) 407-061

(*) Notice: Subject to any disclaimer, the term of this patent is extended or adjusted under 35 U.S.C. 154(b) by 245 days.

(21) Appl. No.: 11/660,808

(22) PCT Filed: Aug. 25, 2005

(86) PCT No.: PCT/KR2005/002816

§ 371 (c)(1),
(2), (4) Date: Feb. 22, 2007

(87) PCT Pub. No.: WO2006/022525

PCT Pub. Date: Mar. 2, 2006

(65) Prior Publication Data

US 2007/0290670 A1 Dec. 20, 2007

(30) Foreign Application Priority Data

Aug. 25, 2004 (KR) .................. 10-2004-0067217

(51) Int. Cl.
*H01F 30/12* (2006.01)
*G05F 1/12* (2006.01)
*H02J 1/02* (2006.01)
*H02H 7/04* (2006.01)

(52) U.S. Cl. ............ 323/361; 323/247; 307/105; 361/35

(58) Field of Classification Search ........ 323/361, 323/247, 250, 328, 334, 336; 336/212, 181, 336/182; 363/39; 361/35; 307/105
See application file for complete search history.

(56) References Cited

U.S. PATENT DOCUMENTS

| | | | | |
|---|---|---|---|---|
| 5,345,375 A | * | 9/1994 | Mohan | ............ 363/40 |
| 5,656,924 A | * | 8/1997 | Mohan et al. | ............ 323/210 |
| 5,790,356 A | * | 8/1998 | Bottrell et al. | ............ 361/35 |
| 5,982,262 A | | 11/1999 | Levin | |
| 7,489,485 B2 | * | 2/2009 | Alakula et al. | ............ 361/35 |

FOREIGN PATENT DOCUMENTS

| | | |
|---|---|---|
| KR | 2001-0083809 | 9/2001 |
| KR | 20-0338373 | 1/2004 |
| KR | 10-0534144 | 11/2005 |

* cited by examiner

*Primary Examiner*—Jessica Han
*Assistant Examiner*—Emily Pham
(74) *Attorney, Agent, or Firm*—Bacon & Thomas, PLLC

(57) ABSTRACT

The invention is a harmonics reduction device for three-phase poly-wire power lines, which can more reliably eradiate harmonics current applied to an electric power system via a neutral line. The invention comprises an electric power system having three-phase poly-wire power lines in order to supply alternating-current (AC) power voltage to a load; a zigzag transformer in which windings connected with three-phase lines in the electric power system are wound through first and second legs, second and third legs, and third and first legs of a core having three legs, respectively, while varying direction of each magnetic flux, and an intermediate point of each winding is commonly connected with a neutral line of the electric power system and that of the load; and an open delta connection portion in which an winding connected with the neutral line of a load side is wound through the three legs so as to be connected with a neutral line of the electric power system.

4 Claims, 5 Drawing Sheets

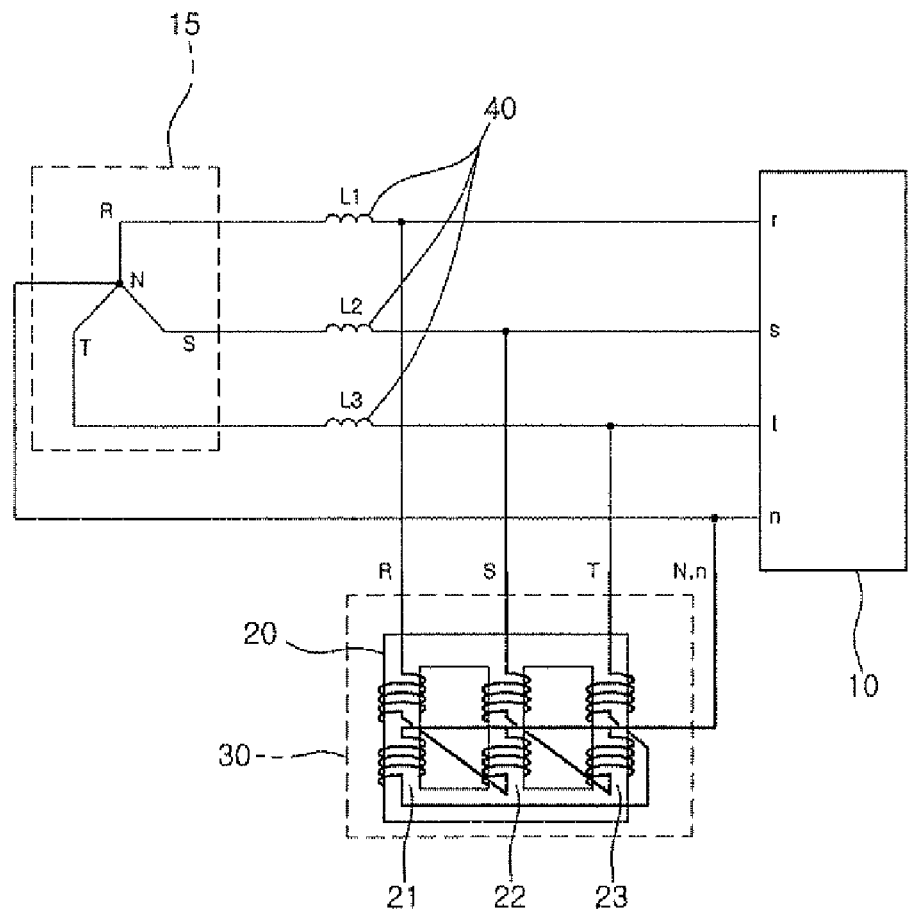
[Fig. 2]
PRIOR ART
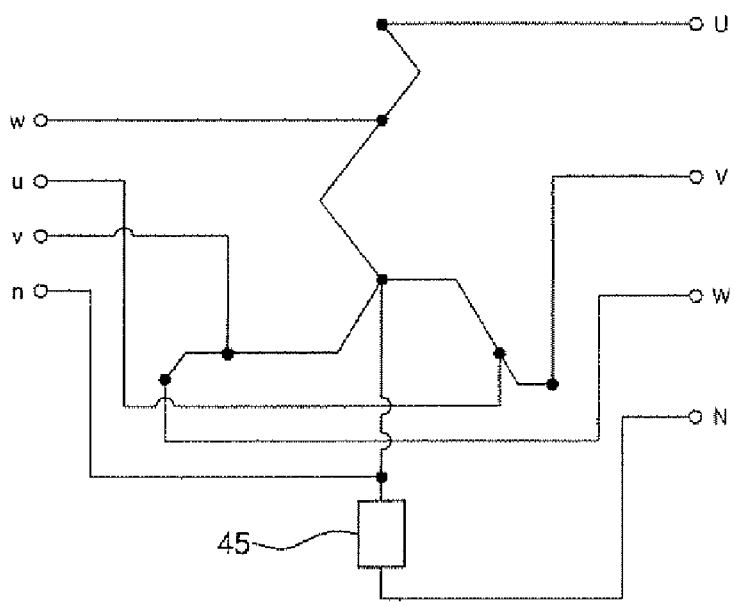

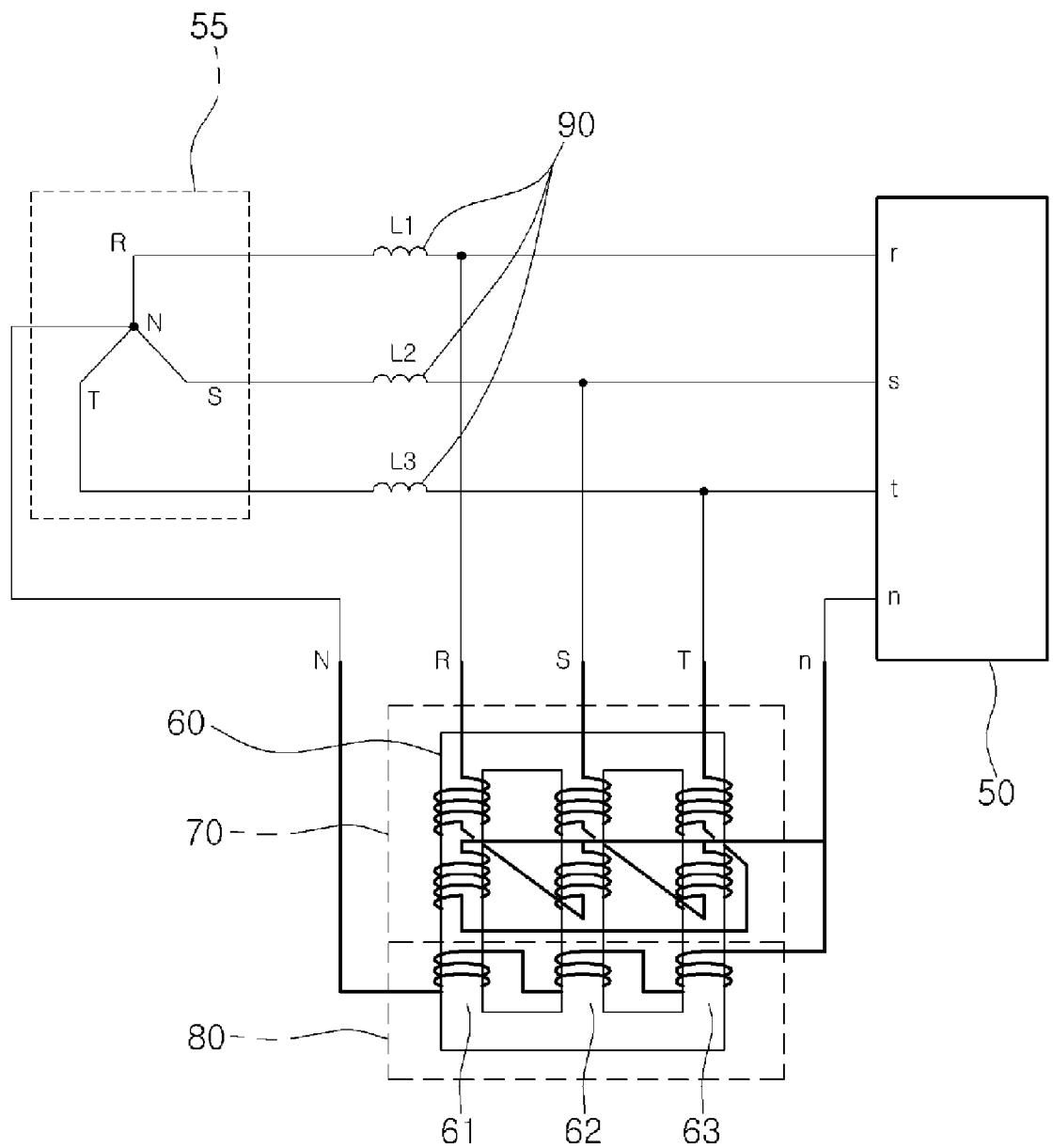
[Fig. 3]

[Fig. 4]
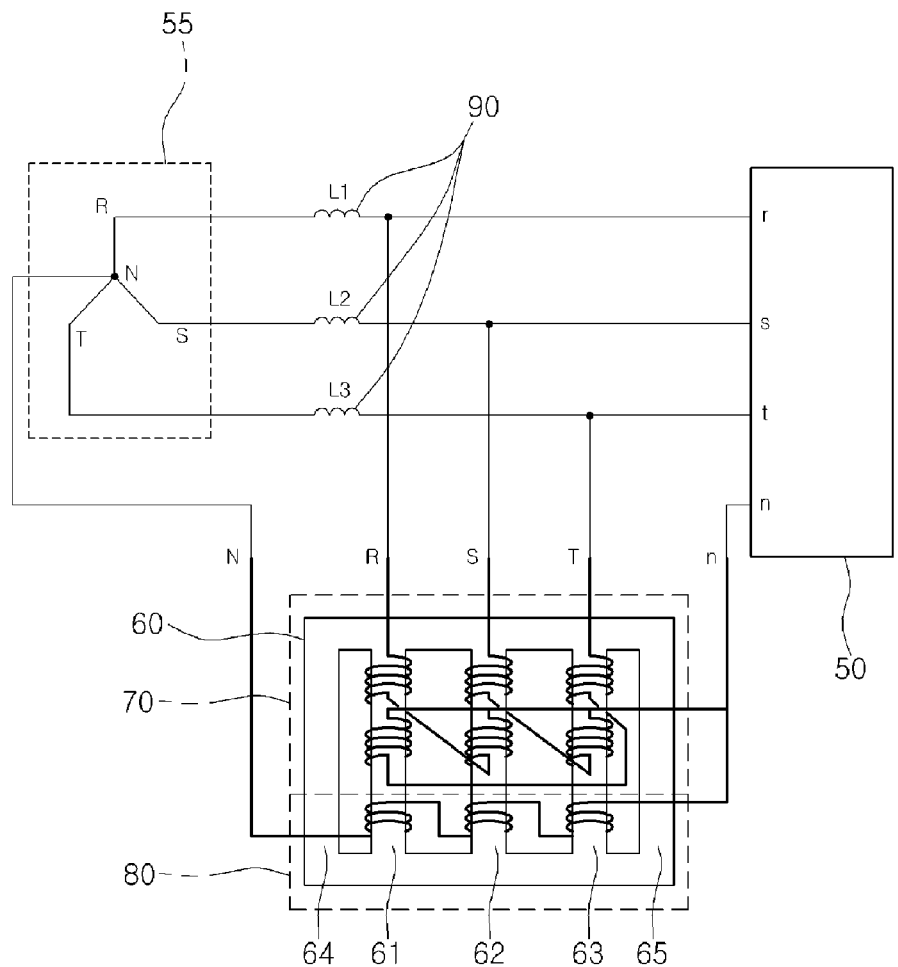
[Fig. 5]
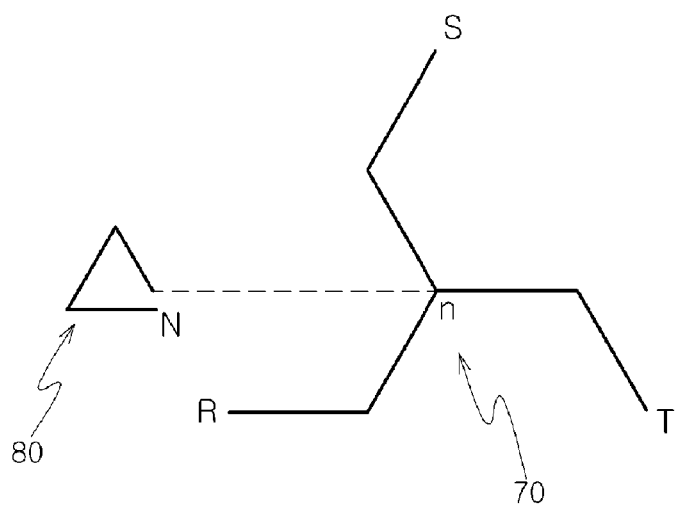

[Fig. 6]
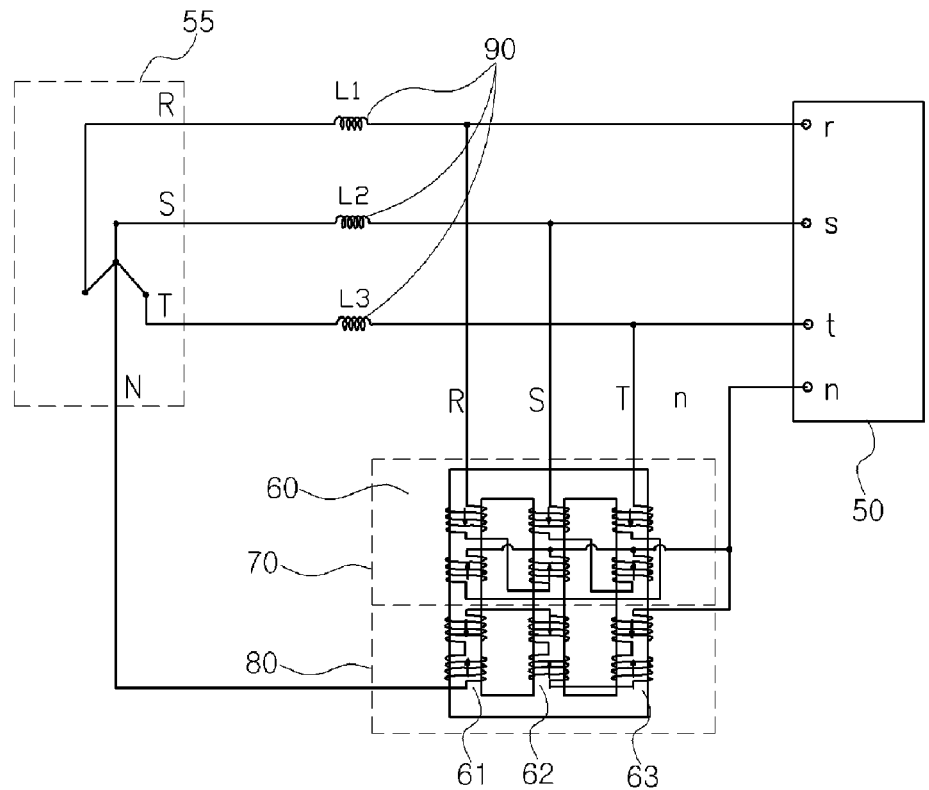
[Fig. 7]
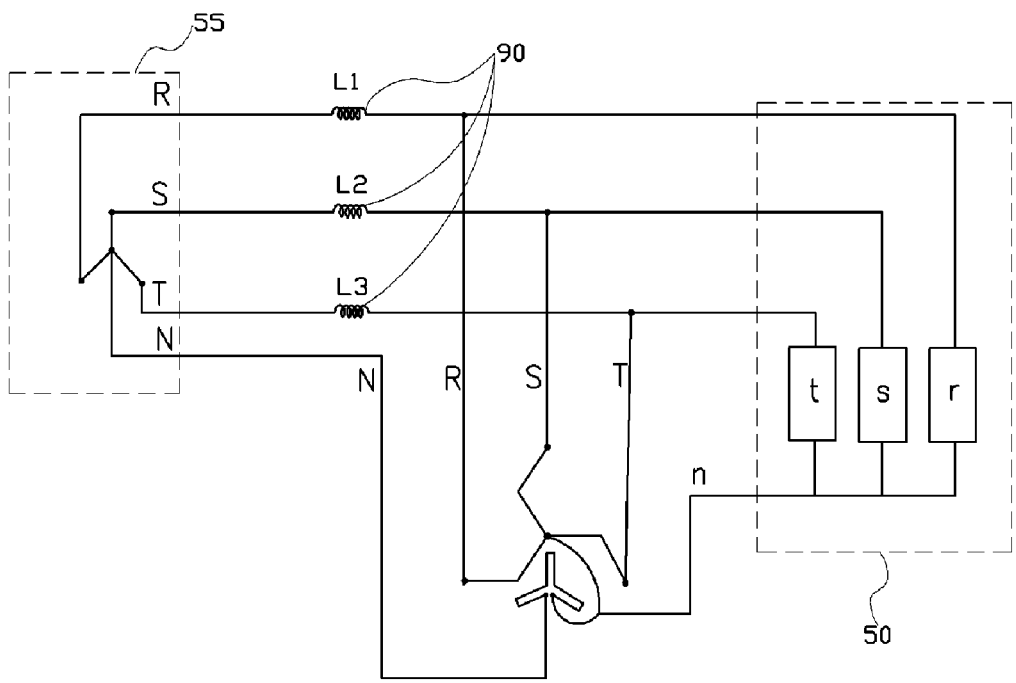

[Fig. 8]
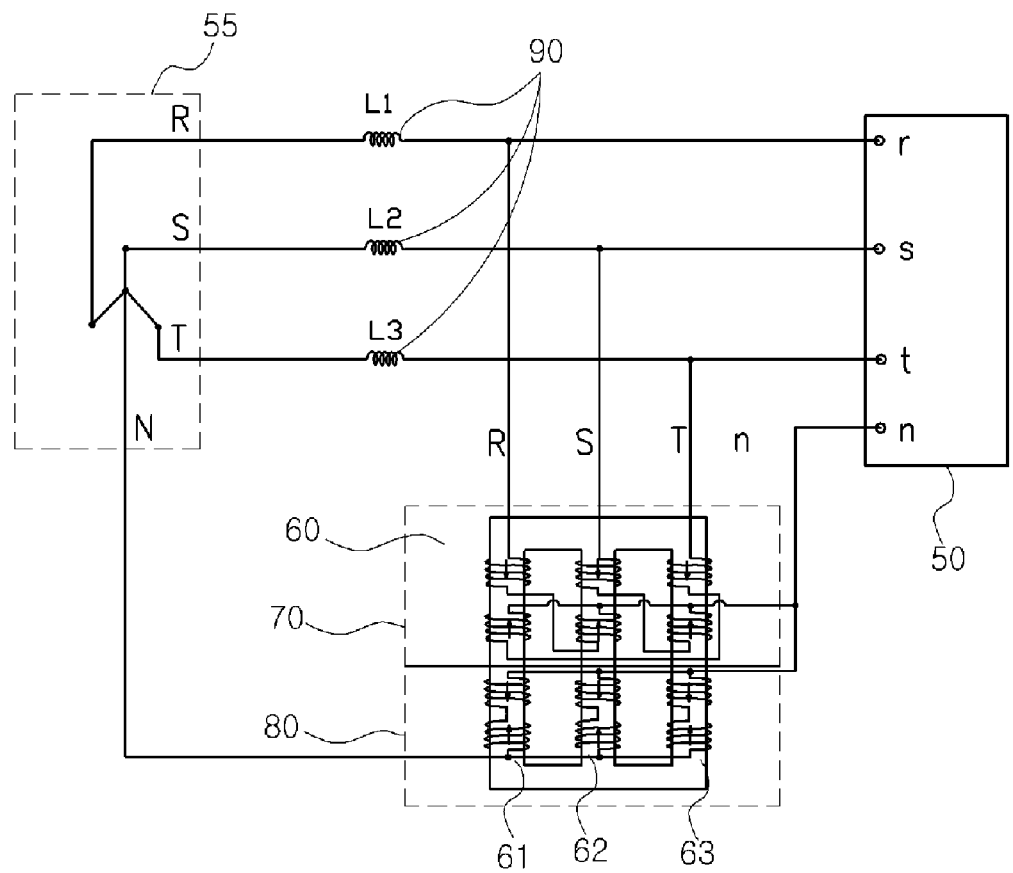
[Fig. 9]
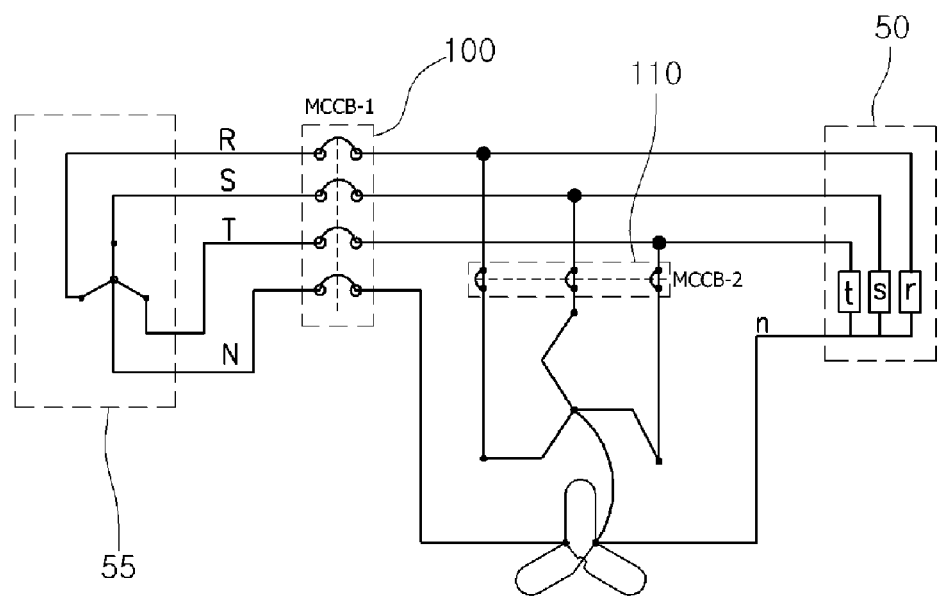

DEVICE FOR REDUCING HARMONICS IN THREE-PHASE POLY-WIRE POWER LINES

TECHNICAL FIELD

The present invention relates to a device for reducing harmonics in three-phase poly-wire power lines, and more particularly to, a harmonics reduction device for three-phase poly-wire power lines, which can more reliably eradiate harmonics current applied to an electric power system via a neutral line.

BACKGROUND ART

As electric devices are being recently increasingly used, harmonics current generated at the load sides are flown into an electric power system via a neutral line, to thereby cause lowering of the output, burning of coils, lowering of a power factor, and a power loss of an electric generator or transformer. Thus, a device for reducing harmonics current should be necessarily installed in the electric power lines.

Most of the conventional harmonics reduction methods are performed by employing reactors installed between a neutral line of an electric power system and that of each load side, in order to reduce harmonics waves. However, the reactors may be overheated by loads such as direct-current equipment, high-speed electric railways, mercury discharging lamps, star-connection wired transformers which generate much harmonics current and thus wires are frequently disconnected or cut. And the harmonics reduction effect by the reactors may be badly fluctuated and the wires would be cut owing to the overdue earth fault current. Accordingly, the neutral line may be disconnected or cut, to accordingly cause problems that the voltage at the load side is not balanced, and the maximum two-times voltage is applied to the load.

To prevent these problems, a device for reducing zero-phase harmonics components was proposed in a Korean patent registration No. 364513 (Laid-open patent publication No. 2001-0083809 published on 3 Sep. 2001 entitled "Device for reducing harmonics in a power line"), in which neutral line reactors are not used, and a zigzag transformer is installed between an electric power system and a load system. FIG. 1 is a circuitry diagram showing the harmonics reduction device. The harmonics reduction device includes: an electric power system 15 having three-phase poly-wire power lines in order to supply alternating-current (AC) power voltage to a load 10; a zigzag transformer 30 in which windings connected with three-phase lines in the electric power system 15 are wound through first and second legs 21 and 22, second and third legs 22 and 23, and third and first legs 23 and 21 of a core 20 having three legs 21, 22 and 23, respectively, while varying direction of each magnetic flux, and an intermediate point of each winding is commonly connected with a neutral line of the electric power system 15 and that of the load 10; and a line reactor 40 which is connected along each phase line between the electric power system 15 and the zigzag transformer 30. The harmonics reduction device does not use a reactor along the neutral line, and thus prevents the neutral line from being disconnected or cut. Also, the harmonics reduction device reduces zero-phase harmonics due to offset of a magnetic flux via the zigzag transformer 30, and thus prevents damage of the electric power system 15 due to zero-phase impedance.

DISCLOSURE OF INVENTION

Technical Problem

However, in the harmonics reduction device shown in FIG. 1, the neutral line of the electric power system 15 is directly connected with that of the load 10. As a result, harmonics current which is introduced via the neutral line of the load 10 is not completely suppressed. Also, when zero-phase harmonics current returns to the load 10, part of the zero-phase harmonics current is introduced into the electric power system 15.

Meanwhile, a Korean Utility-model Registration No. 338373 discloses a harmonics reduction device improving balance between voltage and current, in order to solve problems of the zigzag transformer harmonics reduction device. FIG. 2 shows a vector diagram of the harmonics reduction device disclosed in the Korean Utility-model Registration No. 338373. Referring to FIG. 2, a reactor 45 is connected between a neutral line of an electric power system and that of a load. Accordingly, harmonics components to be introduced into the electric power system via the neutral line are removed through the reactor 45. That is, the harmonics reduction device disclosed in the Korean Utility-model Registration No. 338373 provides a harmonics removal effect through balance of voltage and current. However, the harmonics reduction device disclosed in the Korean Utility-model Registration No. 338373 does not completely remove danger of disconnection or cut of the neutral line, as in the case of a conventional method of employing a reactor along the neutral line, because the harmonics reduction ratio is fluctuated and the neutral line may be damaged by the overdue earth fault current.

Technical Solution

To solve the above problems, it is an object of the present invention to provide a device for reducing harmonics in three-phase poly-wire power lines, which prevent an accident where a neutral line is disconnected or cut, and offsets most harmonics current to be introduced into a neutral line of an electric power system through a neutral line of a load side, to thereby safely keep the electric power system from the harmonics.

To accomplish the above object of the present invention, according to an aspect of the present invention, there is provided a device for reducing harmonics in three-phase poly-wire power lines in order to prevent harmonics current from being introduced into an electric power system, the harmonics reduction device comprising: an electric power system having three-phase poly-wire power lines in order to supply alternating-current (AC) power voltage to a load; a zigzag transformer in which windings connected with three-phase lines in the electric power system are wound through first and second legs, second and third legs, and third and first legs of a core having three legs, respectively, while varying direction of each magnetic flux, and an intermediate point of each winding is commonly connected with a neutral line of the electric power system and that of the load; and an open delta connection portion in which an winding connected with the neutral line of a load side is wound through the three legs so as to be connected with a neutral line of the electric power system.

According to another feature of the present invention, the harmonics reduction device in three-phase poly-wire power lines further comprises line reactors which are connected along the respective phase lines between the electric power system and the zigzag transformer in order to remove harmonics components equaling or higher than fifth harmonics.

According to still another feature of the present invention, the harmonics reduction device in three-phase poly-wire power lines is characterized in that the core is a pentagonal outer iron core further comprising outer legs having no windings outside the three legs.

According to a further feature of the present invention, the harmonics reduction device in three-phase poly-wire power lines is characterized in that the front and rear portions of each winding of the open delta connection portion are wound in a different opposing direction so that the magnetic flux directions are offset to each other, and thus are connected with the neutral lines of the electric power system and the load in series or in parallel with each other.

Advantageous Effects

The invention provides a harmonics reduction device which removes zero-phase harmonics current by using a zigzag transformer, and offsets most of the harmonics current introduced into an electric power system via a neutral line at a load side by using an open delta connection portion which open-delta-connects the neutral lines of the electric power system and the load side, to thus reduce most of harmonics components introduced into the electric power system without causing disconnection or cut of the neutral line.

BRIEF DESCRIPTION OF THE DRAWINGS

The above and other objects and advantages of the present invention will become more apparent by describing the preferred embodiment thereof in detail with reference to the accompanying drawings in which:

FIG. 1 is a circuitry diagram showing a conventional harmonics reduction device;

FIG. 2 shows a vector diagram of a harmonics reduction device disclosed in a Korean Utility-model Registration No. 338373;

FIG. 3 is a circuitry diagram showing a harmonics reduction device according to an embodiment of the present invention;

FIG. 4 shows a harmonics reduction device according to another embodiment of the present invention;

FIG. 5 shows a vector diagram of a harmonics reduction device according to the present invention;

FIG. 6 shows a harmonics reduction device according to still another embodiment of the present invention;

FIG. 7 shows a vector diagram of a harmonics reduction device of FIG. 6;

FIG. 8 shows a harmonics reduction device according to a further embodiment of the present invention; and FIG. 9 shows a vector diagram of a harmonics reduction device of FIG. 8.

BEST MODE FOR CARRYING OUT THE INVENTION

Hereinbelow, a harmonics reduction device in three-phase poly-wire power lines according to the present invention will be described with reference to the accompanying drawings.

FIG. 3 is a circuitry diagram showing a harmonics reduction device according to an embodiment of the present invention.

Referring to FIG. 3, a harmonics reduction device in three-phase poly-wire power lines according to the present invention includes a zigzag transformer 70 in which windings connected between an electric power system 55 and a load 50 are wound through a core 60 having three legs 61, 62 and 63, respectively, in a zigzag form, and an open delta connection portion 80 in which an winding is wound through the three legs 61, 62 and 63 between a neutral line of the electric power system 55 and that of the load 50. Here, the open delta connection is a connection in which one connecting point among the three connecting points of three phase delta connection is opened.

Preferably, line reactors 90 are connected along the phase lines between the electric power system 55 and the zigzag transformer 70 in order to remove harmonics components equaling or higher than fifth harmonics.

According to another embodiment of the present invention, the core 60 is a pentagonal outer iron core further comprising outer legs 64 and 65 having no windings outside the three legs.

Preferably, the electric power system 55 is a three-phase four-wire Y-coupling transformer of phase lines R, S and T and a neutral line N, and supplies alternating-current (AC) power voltage to a load 50. The zigzag transformer 70 and the open delta connection portion 80 are installed between the electric power system 55 and the load 50. First, the zigzag transformer 70 is a single-winding transformer in which primary windings and secondary windings connected with respective phase lines of the electric power system 55 are wound through two legs among three legs 61, 62 and 63 in a core 60 while varying direction of a magnetic flux in an opposing direction. For example, a primary winding of the winding connected with the phase R is wound around a first leg 61, and a secondary winding thereof is wound around a second leg 62. Here, the end point of the primary winding is mutually connected with the end point of the secondary winding, and the starting point of the primary winding is connected with the neutral line "n" of the load 50. Likewise, a primary winding of the winding connected with the phase S is wound around the second leg 62, and a secondary winding thereof is wound around the third leg 63, and a primary winding of the winding connected with the phase T is wound around the third leg 63, and a secondary winding thereof is wound around the first leg 61, and the starting point of the primary winding of each winding is connected with the neutral line "n" of the load 50. As described above, the zigzag transformer 70 is installed between the electric power system 55 and the load 50. Like a vector diagram shown in FIG. 5, zero-phase current of each phase oppose each other in phase and is offset.

Here, in order to more reliably remove harmonics current introduced into the electric power system 55 via the neutral line "n" at the side of the load 50, the open delta connection portion 80 is installed between the neutral line "N" of the electric power system 55 and the neutral line "n" of the load 50. As shown in the circuitry diagram of the open delta connection portion 80 shown in FIG. 3, a primary T phase winding of connected with the neutral line of the load 50 is wound around the third leg 63, a secondary S phase winding is wound around the second leg 62, and a third R phase winding is wound around the first leg 61, and each winding is wounding in an identical direction, in which the end point of the third R phase winding is connected with the neutral line of the electric power system 55. Any connection point of the three phase open delta connection may be opened to be connected between the neutral line N of the electric power system 55 and the neutral line n of the load 50.

That is, as shown in FIG. 5, the neutral line of the electric power system 55 is not directly connected with the neutral line of the load 50 but is connected via the open delta connection portion 80. Thus, most of the harmonics current introduced via the neutral line of the load 50 is separately consumed in each of the three phases of the open delta connection portion 80. Thus, most of the harmonics current is removed and thus very feeble fundamental current is applied to the electric power system 55. Here, in order to move harmonics components equaling or higher than fifth harmonics introduced into the electric power system 55 via each phase line at the end of the load 50, the line reactors 90 are additionally installed along each phase line between the electric power system 55 and the zigzag transformer 70.

Meanwhile, referring to FIG. 4 showing a harmonics reduction device according to another embodiment of the present invention, a core 60 is a pentagonal outer iron core further comprising outer legs 64 and 65 having no windings outside three legs 61, 62 and 63. In this case, each winding is enclosed inwards from the core by the outer legs 64 and 65, to thus more reliably remove harmonics components of irregular frequencies.

FIG. 6 shows a harmonics reduction device according to still another embodiment of the present invention, and FIG. 7 shows a vector diagram of a harmonics reduction device of FIG. 6. Referring to FIGS. 6 and 7, the front and rear portions of each winding of the open delta connection portion 80 are wound in an opposing direction to each other so that the magnetic flux directions are offset to each other, and thus is connected in series between the neutral lines of the electric power system 55 and the load 50. In addition to the effect of the above-described previous embodiment of the present invention, the present invention provides an effect which can offset a voltage difference occurring between both ends of the open delta connection portion 80 since voltages of the three-phase windings are summed to offset one another at the time of interruption of the three-phase electric power source for the zigzag transformer 70.

FIG. 8 shows a harmonics reduction device according to a further embodiment of the present invention, and FIG. 9 shows a vector diagram of a harmonics reduction device of FIG. 8. Referring to FIGS. 8 and 9, the front and rear portions of each winding of the open delta connection portion 80 are wound in an opposing direction to each other so that the magnetic flux directions are offset to each other, and thus is connected in parallel between the neutral lines of the electric power system 55 and the load 50. In addition to the effect of the above-described previous embodiment of the present invention, the present invention provides an effect which can prevent excessive earth fault current from being introduced to the harmonics reduction device to thus protect the device from being damaged by a fire since earth fault current is dispersed along a parallel circuit when one phase line among the three phase lines at the side of the load 50 is earth-faulted and thus earth fault current flows along the neutral line.

As described above, the harmonics reduction device in the three-phase poly-wire power lines according to the present invention uses the zigzag transformer 70 in order to offset zero-phase harmonics current occurring in load and flowing via neutral line, and uses the open delta connection portion 80 in order to consume most the harmonics components introduced into the neutral line of the electric power system 55 via the neutral line of the load 50. Accordingly, the harmonics reduction device in the three-phase poly-wire power lines according to the present invention can remove most of the harmonics current introduced into the electric power system 55 via the neutral line without installing a reactor along the neutral line.

As described above, the present invention has been described with respect to particularly preferred embodiments. However, the present invention is not limited to the above embodiments, and it is possible for one who has an ordinary skill in the art to make various substitutions, modifications and variations, without departing off the spirit of the present invention. For example, the harmonics reduction device in the three-phase poly-wire power lines according to the present invention further comprises an automatic switch which makes both ends of the open delta connection portion shorted in order to prevent any voltage from being induced at both ends of the open delta connection portion in the neutral line in the case that the zigzag transformer 70 and the three-phase electric power source is interrupted, or a cut-off switch which can cut off a main electric power source. Further, the zigzag transformer can be modified in various forms.

Thus, the protective scope of the present invention is not defined within the detailed description thereof but is defined by the claims to be described later and the technical spirit of the present invention.

INDUSTRIAL APPLICABILITY

As described above, the present invention provides a harmonics reduction device which removes zero-phase harmonics current by using a zigzag transformer, and offsets most of the harmonics current introduced into an electric power system via a neutral line at a load side by using an open delta connection portion which open-delta-connects the neutral lines of the electric power system and the load side, to thus reduce most of harmonics components introduced into the electric power system without causing disconnection or cut of the neutral line.

Further, the front and rear portions of each winding of the open delta connection portion 80 are wound in an opposing direction to each other so that the magnetic flux directions are offset to each other, and thus each winding thereof is connected in series or parallel between the neutral lines of the electric power system 55 and the load 50.

Accordingly, the present invention provides an effect which can offset a voltage difference occurring between both ends of the open delta connection portion 80 at the time of interruption of the three-phase electric power source for the zigzag transformer 70, or an effect which can prevent excessive earth fault current from being introduced to the harmonics reduction device to thus protect the device from being damaged by a fire since earth fault current is dispersed along a parallel circuit of the neutral line when one phase line among the three phase lines at the side of the load 50 is earth-faulted.

The invention claimed is:

1. A device for reducing harmonics in three-phase poly-wire power lines in order to prevent harmonics current from being introduced into an electric power system, the harmonics reduction device comprising: an electric power system having three-phase poly-wire power lines in order to supply alternating-current (AC) power voltage to a load; a zigzag transformer in which windings connected with three-phase lines in the electric power system are wound through first and second legs, second and third legs, and third and first legs of a core having three legs, respectively, while varying direction of each magnetic flux, and an intermediate point of each winding is commonly connected with a neutral line of the electric power system and that of the load; and an open delta connection portion connected between the neutral line of the load side and the neutral line of the electric power system, wherein the open delta connection is wound though the three legs of the core in sequence such that the directions of the magnetic flux of the three legs are the same, and one of the connection points of the three legs is open and opened ends of the opened connection point are connected between the neutral line of the load side and the neutral line of the electric power system.

2. A device for reducing harmonics in three-phase polywire power lines of claim 1, wherein the device further comprises line reactors which are connected along the respective phase lines between the electric power system and the zigzag transformer in order to remove harmonics components equaling or higher than fifth harmonics.

3. A device for reducing harmonics in three-phase polywire power lines of claim 1 or 2, wherein the core is a pentagonal outer iron core further comprising outer legs having no windings outside the three legs.

4. A device for reducing harmonics in three-phase polywire power lines of claim 1 or 2, wherein the front and rear portions of each winding of the open delta connection portion are wound in a different opposing direction so that the magnetic flux directions are offset to each other, and thus are connected with the neutral lines of the electric power system and the load in series or in parallel with each other.

* * * * *